Figure 1:
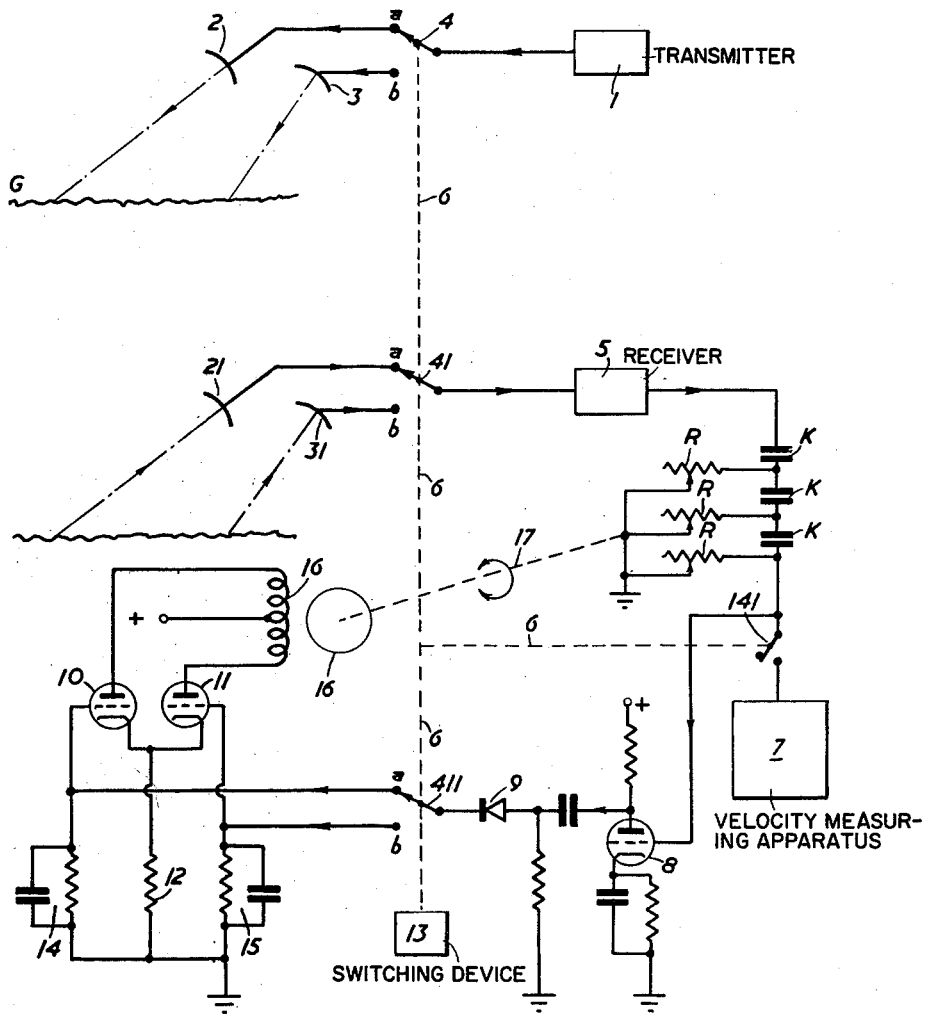

United States Patent Office 3,159,834
Patented Dec. 1, 1964

3,159,834
DOPPLER RADAR SYSTEMS
Giorgio Domenico Fiocco, Essex, England, assignor to The Marconi Company Limited, London, England, a British company
Filed Aug. 10, 1959, Ser. No. 832,515
Claims priority, application Great Britain, Oct. 16, 1958, 33,094/58
5 Claims. (Cl. 343—9)

This invention relates to Doppler radar systems, i.e. to systems in which information as respects a target which has relative movement in relation to the system is derived by measuring a shift of frequency which occurs between a transmitted frequency and the corresponding received echo signal frequency as a result of the relative movement. More specifically the invention relates to airborne speed or drift indicating Doppler radar systems of the kind in which the speed or drift of an aircraft in relation to the earth's surface is ascertained by measuring a Doppler frequency shift which, as a result of aircraft movement, occurs between a transmitted frequency and the frequency of echo signals reflected back from the land or sea.

In airborne speed and drift indicating Doppler radar systems of the kind referred to, at least one radio beam is transmitted obliquely downwards to the earth's surface and is reflected back to the aircraft where measurement of the Doppler frequency shift occasioned is effected to determine the speed or drift of the aircraft, as the case may be. In general a number of such beams are transmitted in different directions with respect to aircraft heading in order that measurement of forward speed and of drift can both be obtained but, in this specification, for the sake of simplicity, only one beam will be considered. It is to be understood, however, that in carrying out this invention, there may be a number of differently directed beams provided for the same purposes as hitherto.

Any transmitted radio beam is necessarily of finite width and therefore an obliquely transmitted beam, sent from an aircraft flying horizontally over the earth's surface down to that surface, will result not in a single Doppler frequency (in the returned echo energy) but in a spectrum of such frequencies, the Doppler frequency corresponding to that ray of the beam which is most nearly vertical being the lowest. Also, that ray which is nearest the vertical will—assuming for the moment that the earth's surface is a uniformly reflecting horizontal surface—produce a stronger echo signal than rays which are further from the vertical. There is thus, inherently, an emphasising of the lower frequency portion of the Doppler spectrum produced. The amount of this emphasis will depend upon the relative powers of echoes returned at different angles of incidence within the beam and hence on the reflecting qualities of the terrain and will be different, for example, when passing over land from when passing over sea. The overall result is that unknown errors in speed and drift measurements occur due to the unknown scattering coefficient of the earth's surface under the aircraft. More specifically the echo signals returned will manifest variation in echo power received and variation in distribution of the power over the Doppler frequency spectrum and hence variation in the speed measurement obtained for a given actual speed of relative movement. It is an object of the present invention to compensate for these unknown errors.

The invention relies on the fact that the variations which occur in the distribution of returned power within a beam also occur to a greater extent among beams of different looking angles of incidence and the differences in power received from the different beams are used to effect calibration or correction of velocity measurement.

The differences in returned power and Doppler frequencies between beams of different looking angles are not entirely due to the variable scattering coefficient, however, but are in part due to other factors, e.g. the distance to the target will normally vary with looking angle and hence, as a result, the proportion of transmitted power appearing in the received echo signal will vary. These other factors are, however, related to geometrical considerations and are consequently predictable. It is the superimposed effects of unknown differing scattering coefficients which are unpredictable and the present invention seeks to meet difficulties and avoid errors due to this cause, which is generally known as "terrain distortion" though the term "sea bias" is also commonly used for it. The former term will be used hereinafter.

According to this invention in its broadest aspect an airborne speed or drift indicating Doppler radar system, of the kind in which velocity measurement is effected by transmitting radio energy obliquely down to the earth's surface and observing the Doppler frequency shift produced in the energy reflected back therefrom, includes means for transmitting said radio energy downward at a number of different looking angles and means for comparing the strengths of the echo signals reflected back and corresponding to the differently directed transmitted beams to derive information for calibrating or correcting the velocity measurement. The invention is based upon the fact that the change of received echo strength produced by a given change of looking angle is a function of terrain distortion. As already stated, a predictable change of received echo strength will, due to considerations of geometry, accompany any change of looking angle and if this predictable change is allowed for, or is small enough to be neglected, comparison of the different echo strengths actually received when different looking angles are employed will give information (with regard to scattering characteristics) from which correct adjustment of the Doppler frequency as measured for velocity measurement can be made.

Theoretically it is possible to carry the invention into effect by simultaneously transmitting a number of beams obliquely downwards at different looking angles or angles of depression and comparing the echo strengths received. This, however, is not preferred, because of the added complexities involved and in practice, in carrying out the invention, a single beam is transmitted in different directions in turn so that different looking angles are in turn obtained.

It is possible to carry out the invention by providing an adjustable filter of suitable adjustable characteristics in the normally provided velocity measuring Doppler frequency channel of the equipment, providing an indicator responsive to an amplitude comparator fed with echo signals obtained at different looking angles, and manually adjusting the filter in accordance with the readings of the indicator. It is, however, preferred to provide means actuated by said comparator, for automatically adjusting the filter. Preferably the comparator is fed from a point on the output side of the filter and actuates a servo device adapted and arranged to adjust the filter until the two inputs to the comparator are in a predetermined relationship, normally the relationship of equality, though this is not theoretically the only predetermined relationship which can be adopted.

The invention is illustrated in the accompanying drawings. These drawings, in which like references denote like parts, show in simplified diagrammatic form three illustrative embodiments of the invention. Separate transmitting aerials and receiving aerials for the two different looking angles are shown in each figure in order to simplify the drawings. It is to be understood, however, that this is not a necessity, and that transmission and reception on a single aerial may be effected in accordance with known practice and also that the same aerial may be used for both looking directions, e.g. by swinging it through an angle. Also in these drawings, only two such directions will be employed, though it is to be understood that the invention is not limited to this.

Referring to FIG. 1, the system therein shown comprises a radar transmitter 1 which can be connected to either of two transmitting aerials 2, 3 through a switch 4 having two positions $a$ and $b$. The aerials 2 and 3 are positioned to transmit obliquely downwards towards the ground G at different looking angles as indicated by the chain lines. Two receiving aerials 21 and 31 having looking angles corresponding to those of the transmitting aerials 2 and 3 respectively and adapted to co-operate respectively with the said two transmitting aerials are connectable through a switch 41 to a receiver 5. The switch 41 has two positions marked $a$ and $b$ and is ganged with the switch 4 as indicated by the broken chain line 6. Output from the receiver 5 is fed to a filter of adjustable characteristics and exemplified as consisting of series condensers K and shunt adjustable resistances R. Output from the filter is fed to velocity measuring apparatus through a switch 141 ganged with the switches 4 and 41. The velocity measuring apparatus is as known per se and represented merely by the block 7. Output from the filter is also taken to the control grid of an amplifying valve represented by the triode 8 which feeds into a rectifier 9. The rectified output from this rectifier can be fed to the control grid of one or the other of two valves 10 and 11 having a common cathode resistance 12 by means of a switch 411 also having two positions $a$ and $b$. The switch 411 is ganged with the switches 4 and 41 as indicated by the broken chain line 6 and the three switches are alternated in position at a suitable switching frequency by means of any suitable switching arrangement represented by the block 13 so that all three switches are simultaneously either on their $a$ contacts or on their $b$ contacts. The control grids of the valves 10 and 11 are connected to ground through resistance-capacity smoothing circuits 14 and 15 respectively. The anodes of the valves 10 and 11 feed differentially into an electric motor 16, the armature of which is mechanically connected to adjust the wipers on the resistances R simultaneously as indicated by the chain line 17. For simplicity, the motor is shown as having a field winding connected directly between the anodes 10 and 11, but any suitable amplifier and/or relay system may be interposed between the valves 10, 11 and the motor 16 so long as the arrangement is such that the motor runs in one direction or the other in dependence upon which valve provides the larger output and is stationary when the outputs from the two valves are equal. It is assumed, in the embodiment illustrated, that the difference between the two reflected powers (at aerials 21 and 31) due only to geometrical considerations, which are independent of the scattering coefficient of the terrain, are either negligibly small or that their effect is eliminated by suitable counterbalancing gain or attenuation means (not shown) inserted in the appropriate receiving channels.

As will be apparent, this arrangement will set itself automatically to an adjustment at which the motor stops. The characteristic of the filter will now be such as to compensate for the difference, due to the unknown scattering coefficient, in the power received by the two aerials 21 and 31. Accordingly the filter will also compensate for the variation in the distribution of power over the Doppler frequency spectrum occurring within any one aerial beam, and resulting from a varying scattering coefficient, and will thus serve to correct the velocity measurement made by the apparatus within block 7. Experiment indicates that an adjustable high pass or band pass filter having a characteristic with positive slope is satisfactory for employment between the receiver 5 and the utilisation apparatus at 7.

Figure 2:
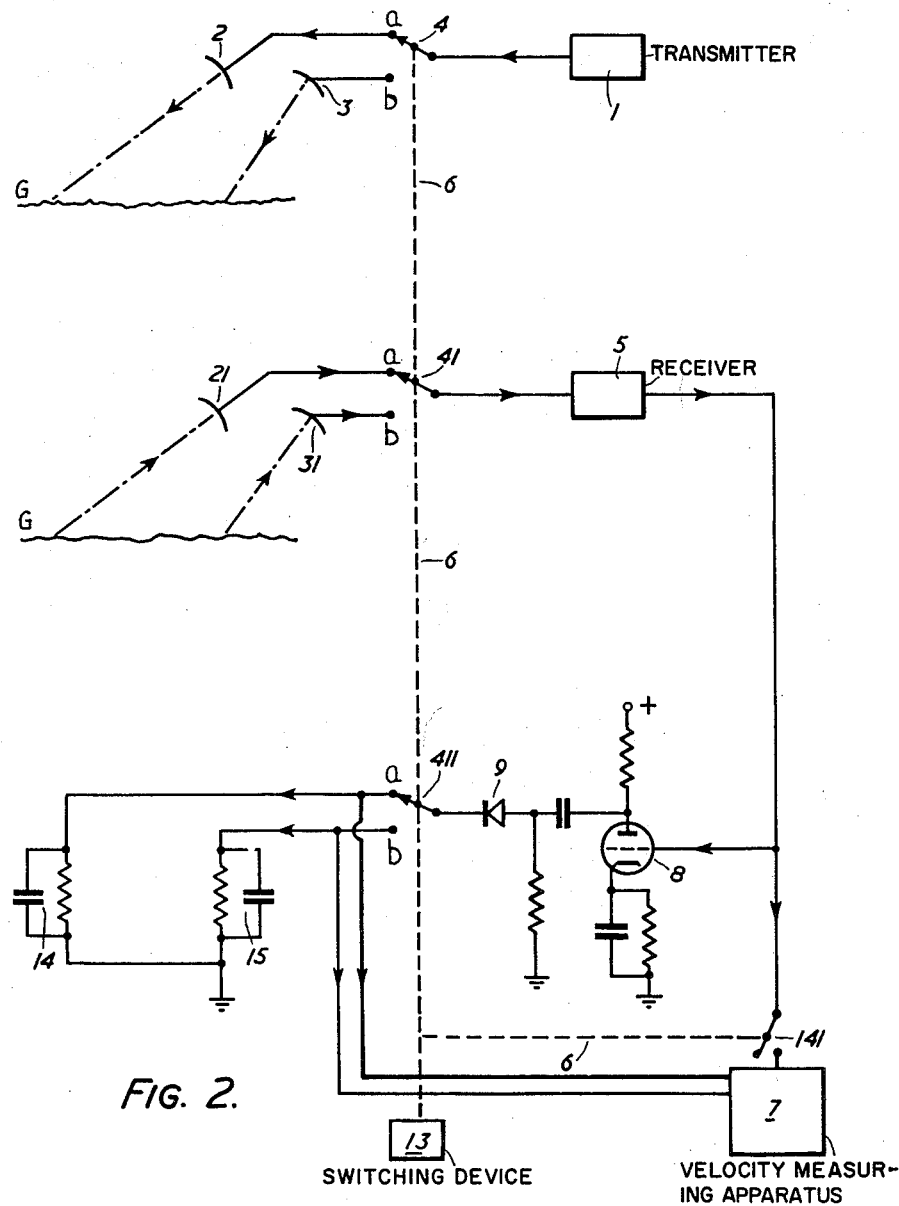

In the modification shown in FIG. 2 output from the receiver 5 is directly fed to the grid of the amplifying valve 8 which, as before, feeds into a rectifier 9. The rectified output from this rectifier is taken to a switch 411 having two positions $a$ and $b$ and ganged with the switches 4 and 41. The terminals $a$ and $b$ of switch 411 are grounded through resistance-capacity smoothing circuits 14 and 15 and also provide two inputs to the velocity measuring apparatus in block 7 to which a third input is also applied from receiver 5 through switch 141 which is ganged with the switches 4, 41, and 411. As will be seen the circuits including the elements 8, 9, 411, 14 and 15 provide measurement of the strengths of the signals received by the aerials 21 and 31 and thus give knowledge of the variation of the reflection characteristics of the reflecting surface or terrain. As already explained, once this knowledge is obtained it is possible, with the aid of a prepared table, to correct the measured speed for terrain distortion or such correction may be done automatically by suitable known computer or correction equipment which, in the accompanying drawing, is presumed to be incorporated in the apparatus in the block 7 and which is actuated by the signals fed thereto from terminals $a$ and $b$ of the switch 411.

Figure 3:
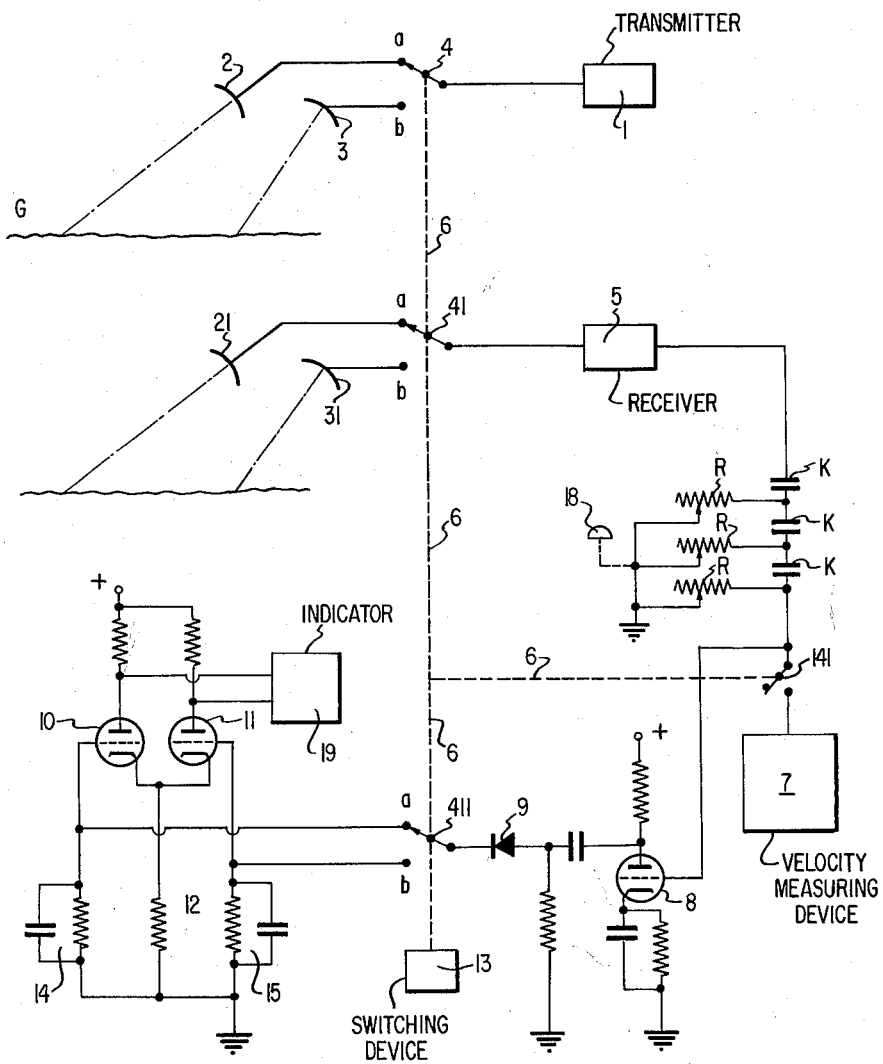

Referrence is now made to FIG. 3 illustrating an embodiment which is quite similar to FIG. 1. The arrangement seen in FIG. 3 corresponds to FIG. 1, except that provision has been made for adjusting the filter characteristic manually instead of automatically. In this embodiment, the motor 16 has been replaced by an indicator 19 connected across the plates of the valves 10 and 11. The indicator 19 serves to indicate the relationship between the outputs of these two valves, whereupon the filter may be manually adjusted to the correct setting. For this purpose the filter is provided with a control knob 18 which adjusts the wipers on the resistances R, the adjustment being made in accordance with the readings of indicator 19.

I claim:

1. An airborne speed or drift indicating Dopplar radar system of the kind in which velocity measurement is effected by transmitting radio energy obliquely down to the earth's surface and in at least one direction with respect to the heading of the craft carrying said system, and observing the Doppler frequency shift produced in the reflected energy, said system including means for transmitting said radio energy downward at a number of different fixed angles of depression and means for comparing the strengths of the echo signals reflected back and corresponding to the radio energy transmitted at said different angles of depression to derive information for correcting the velocity measurements.

2. An airborne speed or drift indicating Doppler radar system of the kind in which velocity measurement is effected by transmitting radio energy obliquely down to the earth's surface and in at least one direction with respect to the heading of the craft carrying said system, and observing the Doppler frequency shift produced in the reflected energy, said system including means for transmitting said radio energy downward at a number of different fixed angles of depression in turn and means for comparing the strengths of substantially the whole Doppler shift frequency range of the echo signals reflected back and corresponding to the radio energy transmitted at said different angles of depression in turn to derive information for correcting the velocity measurements.

3. A system as claimed in claim 1 and comprising a velocity measuring Doppler frequency apparatus, a filter of manually adjustable frequency response characteristics inserted in the received signal channel leading to said apparatus and an indicator responsive to said strength comparator fed with echo signals obtained at different angles of depression, whereby the frequency response of the filter may be manually adjusted in accordance with the readings of said indicator, to correct the velocity measurement for terrain distortion.

4. A system as claimed in claim 1 and comprising a velocity measuring Doppler frequency apparatus, a filter of adjustable frequency response characteristics inserted in the received signal channel leading to said apparatus, and means responsive to said strength comparator fed with echo signals obtained at different angles of depression for automatically adjusting the frequency response of said filter to correct the velocity measurement for terrain distortion.

5. A system as claimed in claim 4 wherein the strength comparator is fed from a point on the output side of the filter and actuates a servo device adapted and arranged to adjust the filter until the two inputs to the strength comparator are in a predetermined relationship.

References Cited by the Examiner
UNITED STATES PATENTS

| | | | |
|---|---|---|---|
| 2,869,117 | 1/59 | Berger | 343—9 |
| 3,023,407 | 2/62 | Basim | 343—9 |
| 3,072,900 | 1/63 | Beck | 343—8 |

CHESTER L. JUSTUS, *Primary Examiner.*

FREDERICK M. STRADER, *Examiner.*